United States Patent
Menzel et al.

(10) Patent No.: US 9,272,443 B2
(45) Date of Patent: Mar. 1, 2016

(54) CERAMIC-POWDER AND/OR METAL-POWDER PRESS TOOL, CERAMIC-POWDER AND/OR METAL-POWDER PRESS, MODULAR SYSTEM WITH SUCH A PRESS TOOL, METHOD FOR ASSEMBLING AND OPERATING A CERAMIC-POWDER AND/OR METAL-POWDER PRESS TOOL OR A PRESS

(75) Inventors: Roland Menzel, Kochel am See (DE); Michael Thomas Silbermann, Bichl (DE); Mathias Metz, Kochel am See (DE)

(73) Assignee: Dorst Technologies Gmbh & Co. Kg, Kochel am See (DE)

( * ) Notice: Subject to any disclaimer, the term of this patent is extended or adjusted under 35 U.S.C. 154(b) by 364 days.

(21) Appl. No.: 13/885,649

(22) PCT Filed: Nov. 12, 2011

(86) PCT No.: PCT/DE2011/001983
§ 371 (c)(1),
(2), (4) Date: Aug. 9, 2013

(87) PCT Pub. No.: WO2012/065597
PCT Pub. Date: May 24, 2012

(65) Prior Publication Data
US 2013/0313741 A1 Nov. 28, 2013

(30) Foreign Application Priority Data
Nov. 16, 2010 (DE) .......................... 10 2010 051 513

(51) Int. Cl.
*B30B 11/02* (2006.01)
*B28B 3/08* (2006.01)
(Continued)

(52) U.S. Cl.
CPC ................. *B29C 33/301* (2013.01); *B28B 3/08* (2013.01); *B30B 1/18* (2013.01); *B30B 11/02* (2013.01); *B22F 3/03* (2013.01)

(58) Field of Classification Search
None
See application file for complete search history.

(56) References Cited

U.S. PATENT DOCUMENTS 3,868,201 A 2/1975 Jacobson et al.
4,270,890 A 6/1981 Öttl
(Continued)

FOREIGN PATENT DOCUMENTS

CN 200945713 Y 9/2007
DE 1627919 7/1971
(Continued)

OTHER PUBLICATIONS

International Search Report mailed Apr. 3, 2013 for International Application No. PCT/DE2011/001983.
(Continued)

*Primary Examiner* — Mary F Theisen
(74) *Attorney, Agent, or Firm* — Knobbe Martens Olson & Bear LLP (57) ABSTRACT

The invention relates, in particular, to a ceramic-powder and/or metal-powder press tool, comprising at least one base body (21), a plurality of at least two punches (22-25) which, in a press position, are arranged to be insertable from one side into a press position, are arranged to be insertable from one side into a die cavity (3) of a die (2) filled with ceramic and/or metal powder (P), a plurality of at least two punch carriers (26-29) each for the attachment of one of the punches, wherein at least part of the die carriers (28; 29) is couplable to at least two adjustment drives (39-42) and wherein the punch carriers are arranged to be adjustable relative to each other and relative to the base body, and positive-stop devices (48°, 49, 50) arranged to divert at least part of a pressing force (Fp) from the punches via the base body in a press end position, wherein at least one of the punch carriers is coupled to or mounted on at least two coupling rods (30-33) and each of the coupling rods is couplable to or mountable on its own such adjustment drive. Electromotive adjustment drives are particularly preferred.

22 Claims, 4 Drawing Sheets

(51) Int. Cl.
*B29C 33/30* (2006.01)
*B30B 1/18* (2006.01)
*B22F 3/03* (2006.01)

(56) References Cited

U.S. PATENT DOCUMENTS

| | | | |
|---|---|---|---|
| 4,370,119 A | 1/1983 | Watanabe | |
| 4,443,171 A | 4/1984 | Dixon | |
| 5,238,375 A * | 8/1993 | Hirai | 425/77 |
| 5,326,242 A * | 7/1994 | Katagiri et al. | 425/78 |
| 7,229,263 B2 | 6/2007 | Silbermann et al. | |
| 2002/0090412 A1 | 7/2002 | Kitamura | |
| 2004/0137100 A1 | 7/2004 | Silbermann et al. | |
| 2007/0062244 A1 * | 3/2007 | Good et al. | 72/413 |
| 2007/0251369 A1 * | 11/2007 | Baltruschat et al. | 83/698.31 |
| 2007/0269334 A1 * | 11/2007 | Lawcock et al. | 419/68 |
| 2009/0317507 A1 | 12/2009 | Eisenberg et al. | |

FOREIGN PATENT DOCUMENTS

| | | |
|---|---|---|
| DE | 102 54 656 | 10/2005 |
| EP | 1658963 | 5/2006 |
| JP | H08-252697 A | 10/1996 |

OTHER PUBLICATIONS

Written Opinion of International Searching Authority for International Application No. PCT/DE2011/001983.
Search Report page of first Chinese Office Action for Chinese Application No. 2011800652257.

* cited by examiner

CERAMIC-POWDER AND/OR METAL-POWDER PRESS TOOL, CERAMIC-POWDER AND/OR METAL-POWDER PRESS, MODULAR SYSTEM WITH SUCH A PRESS TOOL, METHOD FOR ASSEMBLING AND OPERATING A CERAMIC-POWDER AND/OR METAL-POWDER PRESS TOOL OR A PRESS

CROSS-REFERENCE TO RELATED APPLICATIONS

This application is a U.S. National Phase under 35 U.S.C. §371 of International Application No. PCT/DE2011/001983, filed Nov. 12, 2011, which claims priority to German Application Number 10 2010 051 513.2, filed Nov. 16, 2010in the German Patent Office, each of which is hereby incorporated by reference in its entirety.

BACKGROUND

1. Field

The invention relates to a ceramic-powder and/or metal-powder press tool, comprising the features as recited in the preamble of claim 1, to a ceramic-powder and/or metal-powder press comprising such a press tool, to a modular system comprising such a press tool or such a press, to a method for assembling such a ceramic-powder and/or metal-powder press tool or such a press, and to a method of operating such a ceramic-powder and/or metal-powder press, respectively.

2. Description of the Related Art

As an example, a ceramic-powder and/or metal-powder press is known from DE 102 54 656 B4. It comprises a ceramic-powder and/or metal-powder press tool comprising at least one base body, a plurality of at least two punches which, in a press position, are arranged to be insertable from one side into a die cavity of a die filled with ceramic and/or metal powder, a plurality of at least two punch carriers each for the attachment of one of the punches, wherein at least part of the die carriers is couplable to at least two adjustment drives, and wherein the punch carriers are arranged to be adjustable relative to each other and relative to the base body, and positive-stop devices arranged to divert, in a press end position, at least part of a pressing force from the punches via the base body.

Herein, the adjustment drives are formed by hydraulic cylinder arrangements, wherein two pistons of the cylinder arrangements extend through the tool up to the associated punch carrier and have to be fixedly coupled with the punch carrier. A problem in this can be that a single pump is used to feed the two cylinder arrangements, for cost reasons, and thus the two cylinder arrangements are driven by a common control system. To prevent undesirable pressure compensation between the cylinder chambers of the two cylinder arrangements, it is thus necessary to provide on the one hand a very rigid connection between the piston and the associated punch carrier, and on the other hand, in addition, a guide arrangement for the punch carrier. Guide rods serve as the guide arrangement. Such guide rods extend from a base body through all punch carriers and as a rule also serve to guide the die.

The punch carriers are formed in a corresponding manner, in particular, as square plates having a wide dimension in the direction transverse to the pressing axis. A drawback of such an arrangement is, in particular, that it must be possible to press a great number of variously formed and variously dimensioned press parts with such a tool. Each of the components thus has to be able to pass on the greatest possible proportion of the pressing force, which is to be received by the punch supported on the plate. As a consequence, all components have to have large dimensions in the direction of the pressing axis and in the direction of the plane transverse to the pressing axis enabling these forces, comprising almost the entire pressing force of the main press cylinder, to be received. For this reason, there is a great need for space. Moreover, a great amount of material is necessary to construct the individual components, which not only makes the tool very heavy, but also leads to a great increase in material cost. This also entails the need for large-size adjustable positive stops, in particular. As a result of the great space requirements of the positive stops, the plate drives or adjustment drives of the punch carriers have to be arranged far on the outside or far removed from the pressing axis. A thickness of the punch carriers must be increased correspondingly, so that they do not bend.

To provide variability with respect to various parts and in view of the dimensions of the individual components, a maximum punch carrier stroke between two of the punch carriers of, for example, 100 mm, must be possible. To achieve variability, this should apply to every distance between any combination of two adjacent ones of the punch carriers. Since it must be possible that the punch carriers are able to travel a full stroke independently from each other and the punch carriers are arranged one on top of the other, the strokes and heights of the punch carriers are added, increasing the structural height. In order to bridge such heights, usually, additional spacers are inserted between punch carriers and the tool, or further tool components.

In arrangements with height-adjustable positive stops in the area of the base plate, high cups have to be set on top of the positive stops, which leads to problems in view of the cups being upset under the effective pressing force.

SUMMARY

The object of the invention is to simplify a ceramic-powder and/or metal-powder press tool and a ceramic-powder and/or a metal-powder press comprising such a press tool with respect to their structure and to provide methods for assembling and of operating such a ceramic-powder and/or metal-powder press or its tool. In particular, the required structural height should be reduced while maintaining or increasing stability.

In particular, a press tool with several planes is to be provided, wherein the diameters of screw-on surfaces can be selected with sufficient size also for the innermost tool or the innermost punch, to enable mounting of any conceivable central rods or punches. Preferably, diameters of different planes should not be obliged to increase toward the top or in the direction of a die as compared to a plane further down. Positioning of positive stops should be definable with maximum variability. In particular, each plane should be enabled to receive the highest pressing force so that variability in view of different press parts is maintained. A material thickness of the punch carriers, as well as of the other components, should be held as small as possible, so that the structural height, weight and material cost can be kept low. A drive of adjustment drives and coupling thereof to punch carriers should have a configuration that is as simple as possible. It should also be possible to reduce the strokes of individual punch carriers to those actually needed for the relevant press part. As far as possible, great yielding of components and thermal conditions influencing the length of components should be excluded as interfering criteria.

The object is achieved by a ceramic-powder and/or metal-powder press tool comprising the features of claim 1, by a ceramic-powder and/or metal-powder press comprising such a press tool and the features of claim 7, by a modular system comprising the features of claim 11, and in particular by a method for assembling such a ceramic-powder and/or metal-powder press tool or such a press comprising the features of claim 12, and by a method of operating such a ceramic-powder and/or metal-powder press comprising the features of claim 15, respectively. Advantageous embodiments are the subject matter of dependent claims.

Therefore, a ceramic-powder and/or metal-powder press tool is preferred, comprising at least one base body, a plurality of at least two punches which, in a press position, are arranged to be insertable from one side into a die cavity of a die filled with ceramic and/or metal powder, a plurality of at least two punch carriers each having attached of one of the punches, wherein at least part of the die carriers is couplable to at least two adjustment drives and wherein the punch carriers are arranged to be adjustable relative to each other and relative to the base body, and positive stop devices arranged to divert, in a press end position, at least part of a pressing force from the punches via the base body, wherein at least one of the punch carriers is coupled to or mounted on at least two out of coupling rods, spindles and/or spindle nuts, wherein each such coupling rod is couplable to or mountable on its own such adjustment drive and wherein each such spindle and/or spindle nut is part of its own adjustment drive.

Such a press tool can be arranged as an independent component below or above a die or can be arranged in pairs below and/or above a die. A press position is understood to be a position of the components of the tool in a state inserted in the press, wherein the punches are inserted in a die cavity from both sides and already compressed powder present therein. A press end position is understood to be the position, in which a preferably maximum pressing force acts via the punches on the material present in the die cavity. In the press end position, the punch carriers are thus in firm or force-transmitting abutment with the positive stops. In the press end position, the use of positive stops preferably relieves the load on the adjustment drives and their components by diverting the pressing forces acting on the punches via the punch carriers and positive stops to the base body and beyond into the frame.

Such an arrangement of a press tool is particularly advantageous when the adjustment drives are designed with electric motors, in particular as spindle drives. This enables the drive of the punch carriers via the coupling rods, spindles or spindle nuts to be particularly sensitive and, at the same time, hard, which enables the design to be compact. It suffices for all components to be designed such that the relevant maximally effective pressing force proportions of each associated punch can be diverted in the press end position. This results in a reduced, in particular, improved structural height for each of the components in the direction of the pressing axis, or in the direction of the powder-filled die cavity. By reducing the component height in the direction of the pressing axis and due to the compact design, the dimension of the components in the plane normal to the pressing axis can also be reduced as a direct consequence. Furthermore, a modular system enables the leeway for strokes of the punch carriers to be reduced to the value actually necessary for each punch to be adjusted, further reducing the structural height.

In the press tool it is preferred when part of the positive-stop devices or interposed support devices comprise bearings through which the coupling rods are passed. While such bearings are not necessary for a great number of embodiments or modular arrangements of the press tool, they advantageously improve the arrangement of the individual components of the press tool and increase the overall stability of the arrangement.

Such a press tool is also independently advantageous, wherein the positive-stop device which supports that one of the punches and its punch carrier via which the highest effective force acts in relation to the remaining punches in the press end position, is formed as a height adjustable positive-stop device comprising a force-transmitting adjustable element and a force-transmitting counter-element, wherein the adjustable element comprises a positive-stop stop, wherein the positive-stop stop is adjusted against a positive-stop counter-stop of the force-transmitting counter-element, and at least one other of the positive-stop devices is formed as a height-adjustable positive-stop device. Such an arrangement enables the number of components, which would otherwise have to be available, to be reduced in a modular system, since generally height-adjustable positive stops can be used, in particular, for all punches or their punch carriers. Preferably, that height-adjustable positive stop over which the highest effective proportion of the pressing force is to be directed, is moved into complete abutment so that fixed stop surfaces are in abutment with each other and preferably no or only a reduced load is transferred to a thread. In particular, such arrangements, or the definition of suitable positive-stop positions within the overall arrangement, in particular, enable the achievement of the highest dimensional precision of the press part.

In such a press tool, at least one of the positive-stop devices and/or at least one support device interposed between the positive-stop devices, can surround or comprise a punch carrier receiving space, which enables free movement of a punch carrier received in the receiving space in and against a pressing direction of the punches. In such an arrangement, the force is preferably diverted via a side wall of the body enclosing the receiving space, preferably in an annular form, in particular in a central or middle position.

Preferably, in such a press tool, the punch carriers will have an elongate, bar-like or star-like extension, and bars formed thereby will be coupled or mounted on the adjustment drives via coupling rods.

The adjustment drives preferably do not transmit or receive proportions of pressing force, or only reduced forces during powder transport as the punch carriers are adjusted in the direction of the die cavity. Such reduced forces can be, in particular, substantially below 1% of the pressing force. For the case that greater forces of the adjustment drives should arise or particularly controlled adjustments of the punch carrier should be effected across the plane transverse to the pressing axis, more than two adjustment drives could also be coupled via corresponding coupling rods and further bars or protrusions of the punch carrier.

Advantageously, such a press tool could also be implemented with a plurality of adjustment drives, wherein at least two of the adjustment drives are coupled to at least one of the punch carriers and the adjustment drives have an electric motor each, and each of the electric motors has its own control, wherein the control means of the adjustment drives adjusting a common punch carrier are driven in synchronism with each other.

Accordingly, a ceramic-powder and/or metal-powder press comprising at least one receiving and/or mounting device is independently advantageous, which is designed for the insertion of a press tool, comprising a press drive having a pressing force, couplable via the at least one receiving and/or mounting device into the base body and into a further base body, opposite the base body, of the present or an opposite tool, and a plurality of adjustment drives, wherein at least two of the adjustment drives are coupled to at least one of the punch carriers. The adjustment drives thus enable the punch carriers to be adjusted relative to each other and relative to the base body.

A press is also preferred as an independent invention, wherein at least part of the adjustment drives are spatially arranged outside of, in particular below or above, a force path, wherein the force path is formed in the press end position by at least the base body or the base bodies, the positive-stop devices and the punches.

In particular, the adjustment drives are also arranged outside of a so-called cross-beam as a frame element of the press surrounding the tool or the tools. In other words, no proportion of the force flux of the actual pressing force extends through the adjustment drives. The actual pressing force is understood to be, in particular, that force which acts on the punch, or the powder, in a press end position. What is not understood thereby, in particular, is a force which acts on the powder during an adjustment movement of the punches by means of the adjustment drives by traversing the punches in or into the die cavity, even if powder transport and also a certain pre-compacting action can be effected thereby.

A press is advantageous, in particular, in which each of the adjustment drives comprises an electric motor and each of the electric motors has its own control, wherein this applies, in particular, when the control means of the adjustment drives adjusting a common punch carrier, are driven in synchronism with each other. While the main press drive can be hydraulic or electric, in particular, the adjustment drives are preferably electric.

A tool is independently advantageous, in particular, for such a press with electrically operated adjustment drives.

In such a press, the die can be adjustably supported in the press frame of the press by means of a die adjustment device in parallel to the adjustment direction of the punches. By these means, the die is independently supported on the press frame in a manner independent of the components of the press tool.

A modular system of such a ceramic-powder and/or metal-powder press tool or a modular system of such a ceramic-powder and/or metal-powder press is thus also independently advantageous, comprising at least two components freely selectable as needed for a pressed part to be pressed from the group comprising supporting devices, positive-stop devices, optionally comprising non-height-adjustable positive stops, coupling rods, and punch carriers, wherein the at least two of the components are each variably available in various dimensions.

In such a modular system, a plurality of differently dimensioned components can preferably be provided for each of the components, per plane of the modular system. By these means, the individual ones of the components can have different thicknesses to enable pressing forces or pressing force proportions of different amounts to be transmitted and to enable selection of components of a suitable thickness for the maximally required pressing force or the maximally required pressing force proportion. The use of support devices is particularly advantageous when positive-stop devices are used having a uniform, small overall height or few different height adjustment ranges, if a great number of support devices having different heights or extensions are provided along the pressing axis. By these means, a required adjusting stroke of the adjustable positive stops can be reduced to a minimum if a main height extension along the pressing axis can be set by means of a support device formed as such a rigid component between two such positive-stop devices.

Moreover, the components of the module can differ with respect to advantageously useable dimensions and arrangements of openings or through-holes formed therein, to provide, for example, a punch carrier receiving space or attachment and guide openings for passing therethrough other components such as coupling rods, spindles, spindle nuts leading to punch carriers, or punch carriers.

A method for assembling such a ceramic-powder and/or metal-powder press tool or such a ceramic-powder and/or metal-powder press is thus independently advantageous, wherein the positive-stop device, which supports that one of the punches and its punch carrier via which the highest effective force acts in relation to the other punches in the press end position, is selected to be a rigid or rigidly acting positive-stop body, and at least one other one of said positive-stop devices is selected to be a height-adjustable positive-stop device.

Such a method is preferred, in which the positive-stop devices are arranged to direct the pressing force of a press drive in the press end position via the base body, in particular via support devices interposed between the positive-stop devices and via the positive-stop devices to the punches and thereby completely around at least part of the punch carriers. In such an approach, the drive units are arranged, and also later controlled, as the case may be, in such a manner, that the adjustment drives are completely coupled out of the force path. For this purpose, for example, the electric drives can be uncoupled from the spindle drives or made load-free.

Such a method is advantageous, in which the positive-stop device, which supports that one of the punches and its punch carrier via which the highest effective force acts in relation to the other punches in the press end position, is used as a height-adjustable positive-stop device comprising a force-transmitting adjustable element and a force-transmitting counter-element, wherein the adjustable element comprises a positive-stop stop, wherein the positive-stop stop is adjusted against a positive-stop counter-stop of the force-transmitting counter-element, and at least one other of the positive-stop devices is formed as a height-adjustable positive-stop device.

A method is thus independently advantageous of operating such a ceramic-powder and/or metal-powder press, in which each of the adjustment drives commonly adjusting one of the punch carriers is driven to synchronously adjust each punch carrier. In addition to an acting force or an inclination of the punch carrier, in particular, an adjustment height of the punch carrier can also be used as a criterion for the drive.

In such a tool, a method for assembling such a ceramic-powder and/or metal-powder press tool or such a ceramic-powder and/or metal-powder press is also independently advantageous, in which the punch carriers are coupled with the adjustment drives pre-arranged within the press only after or as the tool is inserted into the press.

In such a modular structure, the individual tool components, in particular the punch carriers, are only connected with the drives as the tool is installed in the press. By these means, an advantageous choice of the length dimension is possible, which only necessitates an actually needed stroke height and not an excessively high arrangement. Also, the tool need not be loaded with complex drive devices, which can be provided as a standard with a plurality of various combinations of the tool for various press punches always in the same uniform manner. In this way, a means can be already provided to achieve coupling between the tool's components to be adjusted and the drive units provided in the press independently thereof.

A press is thus provided, comprising a press tool, or only an independent press tool for pressing press parts of ceramic powder and/or metal powder, or of corresponding granular materials or mixtures of fine-grain or granular powders. By means of the modular structure, in particular, the shortest possible structure of the adapter or the tool is achieved. This advantageously results in small deformations of the tool in the case, for example, of filling level variations of the powder filled into the die cavity. Finally, press parts can be pressed with higher precision also in the case of filling level variations. The higher-precision pressing, in turn, leads to reduced crack formation in the press parts and thus to a smaller proportion of waste during the pressing method.

Especially, the punch carrier can also be provided in various ways. In addition to various thicknesses in the direction of the pressing axis for receiving pressing force proportions of different strengths, the number of bars extending from a central portion can also be chosen to be higher than two, so that more than two adjustment drives can also be coupled to one punch carrier. Moreover, screw-on diameters for screw-attaching the punches, or of punch attachment components, when further elements are interposed, also of such interposed components, can be provided dimensioned according to the actual need in view of the pressing force proportions to be transmitted. The modular arrangement also enables free association of the individual adjustment drives with the various adjustable planes or punch carriers. Individual definition of the paths extending from the adjustment drives to the individual punch carriers is also possible. The modular structure also enables free association with each positive stop with a coupling diameter to be individually predefined or selectable from a modular set. The association of a number of adjustment drives with the various planes or punch carriers is freely selectable, in particular, wherein a single adjustment drive can also be used, as the case may be, for a single punch carrier, as it is often desired for the so-called central pin or central punch. In such a press tool with a modular structure having a plurality of planes, each plane can be adapted to the individual tool diameter, each plane can be adapted to the individually acting force, and each plane can be adapted to the individually arising paths to be traversed by adjustable components. The press tool can also be assembled outside of the press, wherein, advantageously, drive devices need not yet be assembled, which keeps the structure and weight of the actual press tool small.

Diameters of screw-on surfaces for punches or punch attachment elements on the individual punch carriers can be individually adapted to the punches. This enables the diameters of the screw-on surfaces to be smaller while a diameter of the screw-on surface on a punch carrier is influenced by the diameter of the screw-on surface on the underlying punch carrier. Since the screw-on surfaces overall are smaller, however, than for rigid arrangements, the result is a smaller screw-on surface for the uppermost or outermost die.

The plane with the highest pressing force can always be associated with a non-adjustable positive stop, wherein this can be determined in dependence on the individual press part contour when the tool is assembled. The remaining adjustable positive stops thus effectively only need to transmit small forces and consequently only to provide small surfaces, via which forces are to be transmitted, so that eventually the diameter of the positive stops can also be chosen to be small. Due to the generally small diameter of the components, the adjustment drives can also have a closer arrangement with respect to each other, thus enabling the individual punch carriers to have a smaller dimension in the plane transverse to the pressing axis, whereby their dimensions in the direction of the pressing axis can be thinner due to a reduced risk of bending.

The adjustment drives are only connected with the components of the tool as the tool is installed, wherein, while the strokes of the various planes are added and thus define a minimum structural height, the overall structural height can be kept advantageously small since only the required stroke distances of a certain predefined press part need be considered. An adjustment is also possible by providing and using coupling rods, spindles and other components of different lengths for the distance between the adjustment drive and the punch carrier.

BRIEF DESCRIPTION OF THE DRAWINGS

The following is a more detailed explanation of an exemplary embodiment with reference to the accompanying drawing. The same reference numerals will be used for the same or equally acting components or method steps in the figures. In the case of modified elaborations, modified components will also be identified with additional identification of the reference numerals. As a consequence, descriptions given for one of the figures also apply to the remaining figures which show corresponding components. In the figures.

DETAILED DESCRIPTION OF CERTAIN EMBODIMENTS

Figure 1:
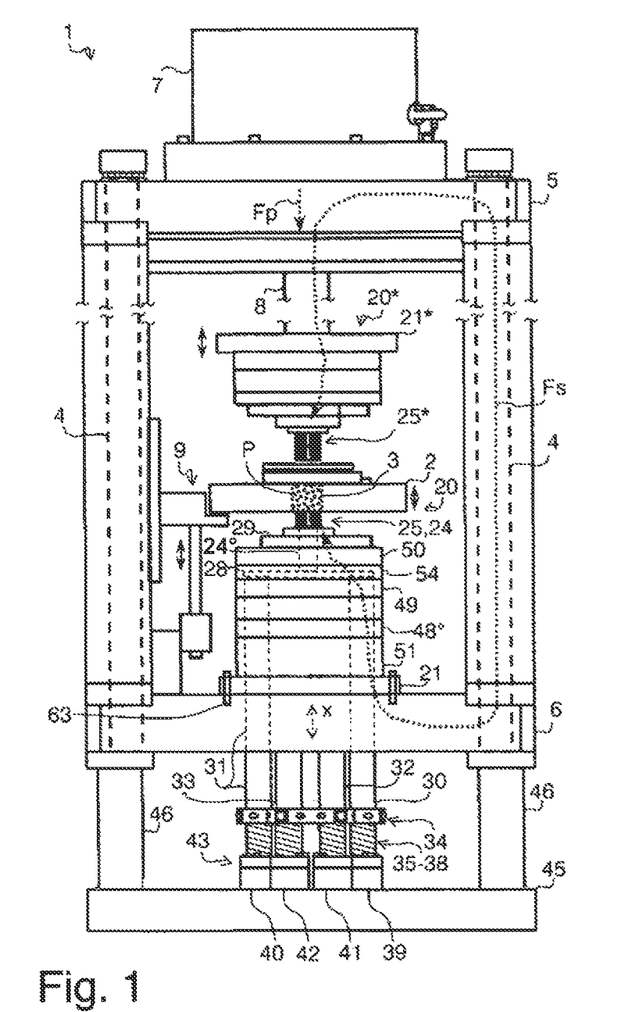
FIG. 1 is a side view of a ceramic-powder and/or metal-powder press with a two-part press tool inserted therein, according to a preferred embodiment.

FIG. 1 is a side view of the ceramic-powder and/or metal-powder press 1, in which an exemplary two-part ceramic-powder and/or metal-powder press tool 20, 20* is used. The bottom press tool 20 is preferably configured.

A die 2 is arranged within the press 1, which has a die cavity 3. The die cavity 3 is to be filled with powder P, in particular ceramic powder and/or metal powder. A powder P, in the widest sense, can also be a granular material or a mixture of a fine-grain powder and a granular material. The powder P is pressed to produce a pressed part with the aid of punches 24, 25, which are inserted into the die cavity 3 from below and further inserted into the latter during pressing, and with punches 25*, which are inserted into the die cavity 3 from the opposite side after the die cavity 3 has been filled with powder. After expulsion of the press part from the die cavity 3, it is filled with powder P again to press another press part.

In a manner known per se, the press 1 comprises a press frame consisting of two press frames 4 on the side, which are fixedly connected at the top and bottom with a top and bottom press frame 6, 5, respectively. Press frames 4-6 are firmly clamped together so that a force flux can build up through the latter up to the punches 24, 25, 25*. To build up or apply a pressing force Fp, the press 1 comprises a press drive 7 arranged, for example, at the top of the press frame 5. The pressing force Fp is applied to the top press tool 20* by the press drive 7 via a press drive piston 8 so that the top press tool 20* is adjusted in the direction of the die 2. By the effective pressing force Fp the individual components of the press tool 20, 20* are moved into abutment and clamped against the bottom press frame 5. Herein, the punches 24, 25, 25\* press the powder P to produce a press part.

To be able to adjust the die 2, together with the remaining components in the direction of the bottom press frame 5, the press 1 comprises a die adjustment device 9, which is mounted on the side press frame 4 and enables height adjustment of the die 2. The height adjustment of the die 2 is adapted to the relative movement of the punches 24, 25, 25\*. Preferably, an electric motor with a spindle drive is used in the die adjustment device 9, while any other drive systems could also be used.

Figure 2:
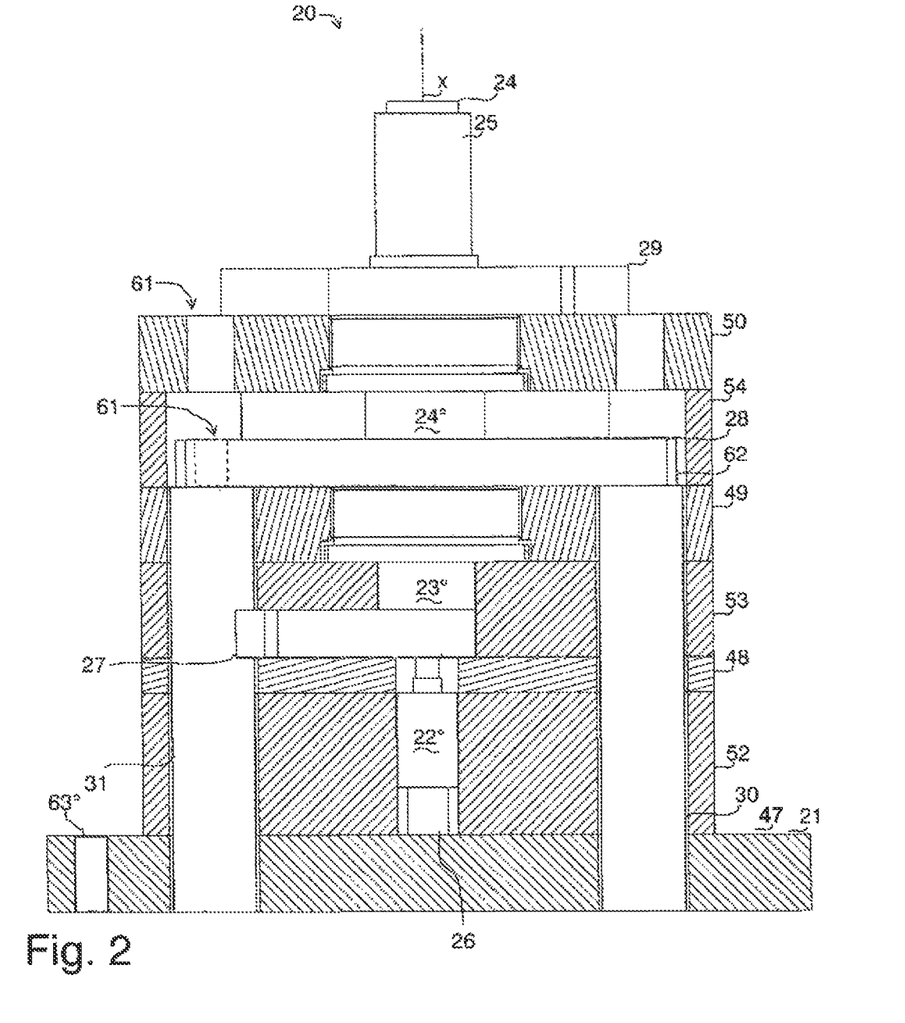
FIG. 2 is a partial sectional view of such a press tool.

As can be seen from FIG. 1 and in particular FIG. 2, a preferred tool 20 consists of a great number of individual components. The opposite top tool 21\* can have a comparable structure in principle, but can also have a conventional structure or a mixed structure of a conventional structure and the structure of the bottom tool 20. The same is true for adjustment arrangements for adjusting the individual components of the top tool 21\*.

The press tool 20 is composed of components of a modular system and enables simple adaption to each press part to be pressed, requiring little space in the pressing direction, in particular, but also in a plane transverse to the pressing direction, due to the modular structure.

At the bottom, the bottom press tool 20 comprises a base body 21, which corresponds to a base body 21\* of the top press tool 20\*. The base bodies 21, 21\* preferably have passage holes or other configurations enabling a releasable, but fixed attachment of the base bodies 21, 21\* at receiving or mounting devices of the press 1. As an example, the top base body 21\* is fixedly coupled to the press drive piston 8, and the bottom base body 21 is fixedly coupled to the bottom press frame 5.

The punches 22-25 are each set on punch carriers 26-29. For this purpose, the punch carriers 26-29 have support and attachment surfaces which, in the particularly preferred embodiment, have a circular configuration. In the middle, the support surfaces each have a passage hole through which punches or attachment elements leading to the punches from punches 22-24, which are set further back, can be passed. The arrangement is preferably rotation symmetrical about a pressing axis x along which an adjustment direction or pressing direction of the punches 22-25, 25\* extends. To the side of the support and attachment surfaces for the punches 22-25, bars protrude from the support and attachment surfaces, preferably having an elongate configuration. As an example, an arrangement is shown having a long bar-like punch carrier 26-29 comprising the support area and attachment area for the punch 22-25 at its middle. Other configurations can also be implemented, in particular configurations with more than two laterally protruding bar elements, which then assume the shape of a star. Elliptic configurations can also be implemented, although they are less preferred because they need more material and also more space within the arrangement of the press tool.

The bar-like elements of the punch carriers 26-29 are attached at the outside and at the bottom of coupling rods 30-33, which are passed through the bottom components of the press tool 20 and through the base body 21.

The coupling rods 30-33 further extend through corresponding openings or bores, which extend through the bottom press frame 5 up to spindles 35-38 of a plurality of adjustment drives 39-42. In principle, spindles or spindle nuts of the adjustment drives could also extend directly to the punch carriers and be fixed thereto.

The adjustment drives 39-42 are electric motor/spindle drives, in particular, which enable highly controlled driving of the adjustment movements.

The coupling rods 30-33 are attached on the end faces of the spindles 35-38 preferably by means of clamping elements, such as coupling devices 34. In principle, a different type of clamping is also possible, wherein a bolt or attachment screw is passed through corresponding openings in the punch carriers 26-29 and further through coupling rods 30-33 formed as hollow rods, from above, to be screwed into threaded openings of the spindles 35-38 at their end faces.

In the preferred arrangement, each individual coupling rod 30-33 has its own spindle 35-38 and its own adjustment drive 39-42 associated with it so that each of the coupling rods 30-33 can be individually driven or controlled. Measuring values of a height adjustment system, but also any other suitable measuring values of other types of measuring systems can be used as parameters for closed-loop control. Preferably the press 1 has its own control device for implementing closed-loop control.

In comparison with hydraulic adjustment drives, electromotive adjustment of the punch carriers 26-29 by means of two independent adjustment drives 29, 40; 41, 42 per each punch carrier 28; 29, enables adjustment movements with high precision so that, in suitable embodiments, in principle, the punch carriers 26-29 could even be loosely placed on the corresponding coupling rods 30-33. Thus, the attachment first and foremost serves to enable a resetting movement. In contrast to hydraulic drives with pressure compensation, in particular, between communicating piston systems for the hydraulic pistons, each associated with a punch carrier, in the case of an electromotive drive using, in particular, a spindle transmission, breaking of the connection between the piston rods 30-33 and the punch carriers 26-29 can be avoided.

As can be seen from FIG. 1, an advantageous embodiment is possible, in particular, wherein the adjustment drives 39-42 can be arranged outside of a force path Fs, wherein the force path Fs extends from the punches 24, 25; 25\* via the press tools 20; 20\* and the press frames 4-6. This is possible because the coupling rods 30-33 can be passed through the bottom press frame 5 so that the adjustment drives 39-42 can be arranged in a space below the actual press frame 4-6. For example, the bottom press frame 5 is supported on frame supports 46, which are set on and preferably attached to a bottom base 45. The bottom base 45 also serves as a support or pedestal for the components of the adjustment drives 39-42. Arranging the adjustment drives 39-42 outside of the force path Fs, in particular arranging them outside of the base body 21 and/or the bottom press frame 5, enables more extensive modularization of the press design. The arrangement of the individual adjustment drives 39-42, or of the components, is variable and, at the same time, needs relatively little structural space. In particular, the bottom press frame 5 and the base body 21, both in the pressing direction and in the plane transverse to the pressing direction, can be reduced to a structural size not exceeding the size necessary for transmitting the pressing force Fp in the case of a particular press part to be pressed.

FIG. 2, in particular, shows a preferred structure of a bottom tool 20, wherein, according to the preferred embodiment as a modular kit, a compact arrangement of positive-stop devices 47-50 and support devices 51-54 can be seen, which receive, and partially guide, at least part of the punch carriers 26-29 and coupling rods 30-33. The modular structure and in particular the structure with preferably bar-like punch carriers 26-29 on the coupling rods 30-33 adjustable by means of electric motors, enables the dimensions, i.e. the heights in the direction of the pressing axis x and also in the direction of a circumference in the plane normal to the pressing axis x, to be optimized with respect to each press part to be pressed.

At the same time, the base body 21 shown can form a rigid positive stop 47 for the bottommost punch carrier 26. Usually, the bottommost punch carrier 26 is traversed by means of a central pin, but not moved against a positive stop. The punch carrier 26 carries a central pin or an inner punch 22 surrounding a central pin.

The punch 22 can be directly attached to the first punch carrier 26, it can also, as shown, be attached to a punch attachment element 22°, which protrudes from and is attached to the punch carrier 26 in the direction of the die cavity.

A second one of the punch carriers 27, which carries a second one of the punches 23 by means of a punch attachment element 23°, is arranged in a higher plane and supported on a positive-stop device 48. The positive-stop device 48 is formed as a rigid, or non-height-adjustable positive-stop device. The positive-stop device 48 is supported on a supporting device 52 which is interposed between the positive-stop device 48 and the base body 21.

This positive-stop device 48 and this supporting device 52, as is the case for all the other positive-stop devices 47-50 and all the other supporting devices 51-54, comprises a plurality of attachment and guide openings 61 having sufficiently large dimensions to pass through the coupling rods 30-33 and punches 22-25 or punch attachment elements 22°, 23°, and to receive the punch carriers 26-28.

Towards the bottom, the punch carrier 26, just like the remaining punch carriers, is connected, via coupling rods (not shown) with its own adjustment drives, also not shown for clarity.

On the second punch carrier 48, there is a third supporting device 53, carrying in turn, a third positive-stop device 49. The third positive-stop device 49 is for supporting the third punch carrier 28 carrying the third punch 24, or a punch attachment element 24° interposed between the third punch 24 and the third punch carrier 28.

On the third positive-stop device 49, there is a fourth supporting device 54, which comprises a punch carrier receiving space 62. The punch carrier receiving space 62, shown as an example, is large enough to enable sufficient adjustment movement of the third punch carrier 28 in the direction of the pressing axis x. Due to the compact structure and the optimized adaption of the individual components to the press part actually to be pressed, a very small adjustment path of a few millimeters, such as 2 mm, may be sufficient in the direction of the pressing axis x. The punch carrier receiving space 62 is preferably only slightly larger than the outer contour of the punch carrier 28 received thereby also in the plane normal to the pressing axis x so that the support device 54 is a body that is as solid as possible and can thus transmit a very high pressing force Fp from the positive-stop device 50 arranged above it to the underlying positive-stop devices 48, 49 and the support devices 52, 53 to the base body 21.

In the exemplary embodiment shown, the two top ones of the positive-stop devices 49, 50 are formed as height-adjustable positive stops. This enables fine adjustment of a positive-stop height in the direction of the pressing axis x for each of the punch carriers 28, 29 set upon it, or the punches 24; 25 set thereon.

In principle the height-adjustable and non-height-adjustable positive-stop devices 47-50 can be freely arranged in a modular design having the present structure. By these means, it is possible to support the punch 23, in particular, to which the highest force proportion of the effective pressing force Fp is applied, by a non-height-adjustable positive stop 48 to receive the main pressing force.

Figure 3:
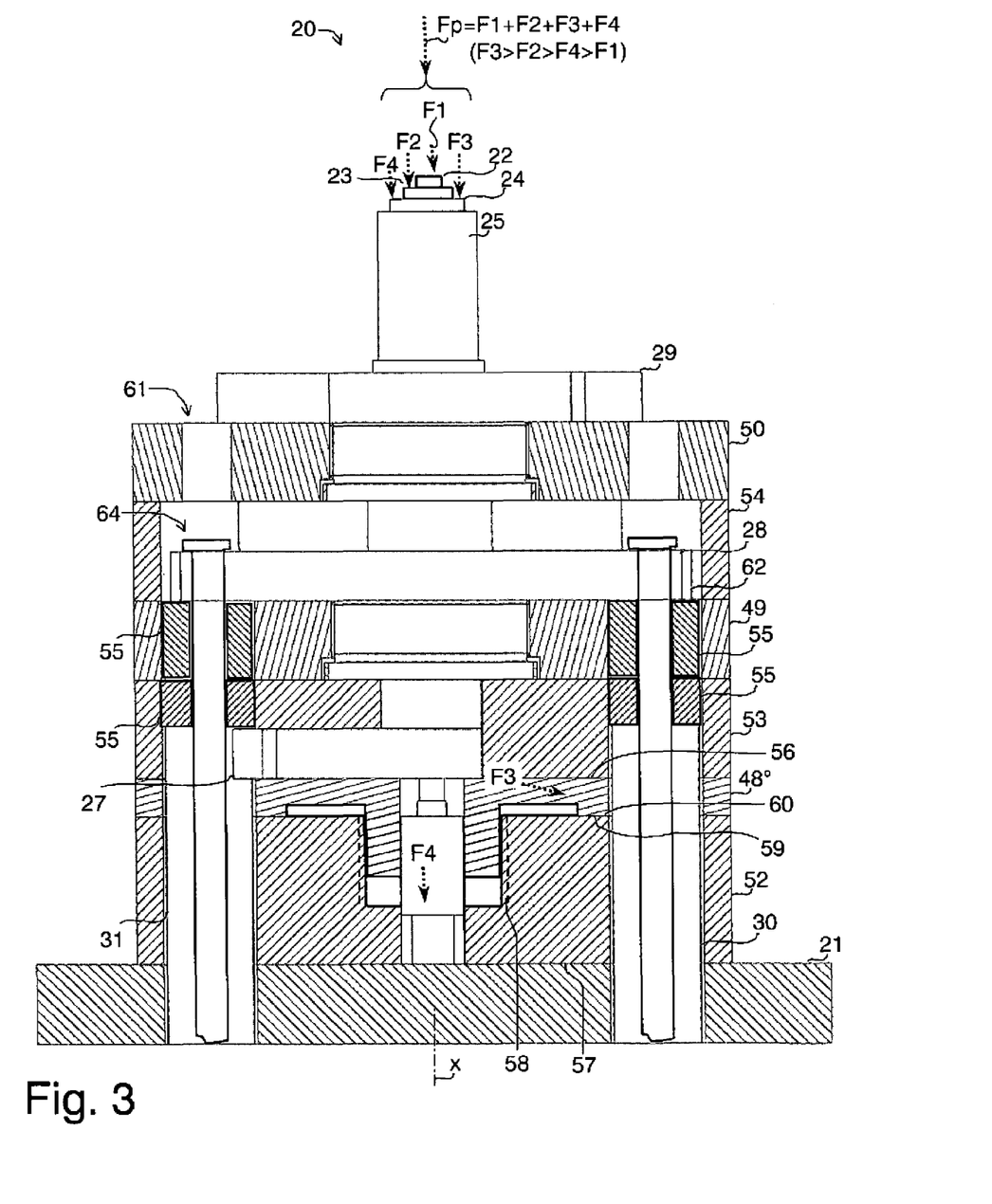
FIG. 3 is a side view of a tool partially modified with respect to the former.

A great number of modifications of this exemplary embodiment are possible. FIG. 3 shows exemplary modifications, wherein only components will be described in the following which differ from the embodiment of FIG. 2.

Ideally, by means of an electromotive adjustment of the piston rods 30-33, in particular, the punch carriers 26-29 can be driven and adjusted with such precision that guiding aids do not appear necessary for the tool 20. Preferably, however, bearings 55 are arranged in one or more of the components, such as bearings 55 in one of the support devices 53 and one of the positive-stop devices 49 in the exemplary embodiment shown. These bearings 55 serve to guide the coupling rods 30, 31 in such support devices 53 and bearing devices 49, which leads to a stronger structure of the overall tool 20 and its rigidly arranged or moveably arranged components relative to each other.

In this exemplary embodiment all the positive-stop devices 48°, 49, 50 are preferably formed as height-adjustable positive-stop devices. To enable the second punch 22 to still be supported on the second punch carrier 27 via a rigid positive stop, and also to transmit a very high effective pressing force proportion F3, this positive-stop device 48° is moved into its lowest height position. For this purpose, a top adjustable element 56 of the positive stop, which comprises a positive-stop stop 59, is retracted to such an extent that the positive-stop stop 59 is in abutment with a positive-stop counter-stop 60 of the bottom element or counter-element 57 of the positive stop. By these means, at the same time, a positive-stop thread 58 between the adjustable and force-transmitting element 26 of the positive stop on the one hand and the adjustable and force-transmitting counter-element 57 on the other hand, is relieved as much as possible from the forces to be transmitted to avoid destruction of or damage to the thread.

On the basis of the modular structure, in particular, a free choice of association of one or more, as the case may be, positive stops is enabled in such a manner that they are associated with punches which have to transmit one of these effective pressing force proportions F1-F4 as the largest of these pressing force proportions F3.

Finally, FIG. 3 also shows an attachment screw 64 as an example, which serves for the attachment of an exemplary one of the punch carriers 28 via its coupling rod 31 to its associated spindle.

Figure 4:
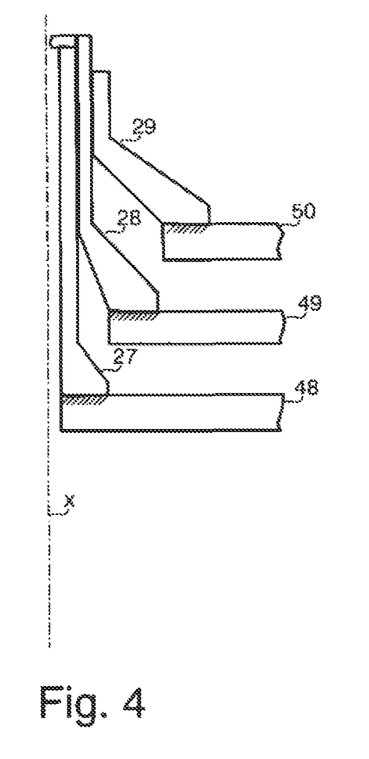
FIG. 4 schematically shows a diagram of surface ratios of a preferred embodiment.

As an example, FIG. 4 shows with reference to a schematic diagram that, with such a modular system, the individual components of the tool 20 can be chosen optimally in a suitable manner for a press part to be pressed, wherein the smallest possible extensions in the direction of the pressing axis x and also the smallest possible extensions in the plane transverse to the pressing axis x can be chosen for each individual one of the component parts. Overall, this results in extremely advantageous space requirements by the tool 20, together with a substantially reduced structural height as compared with conventional tools lacking such a modular structure.

Figure 5:
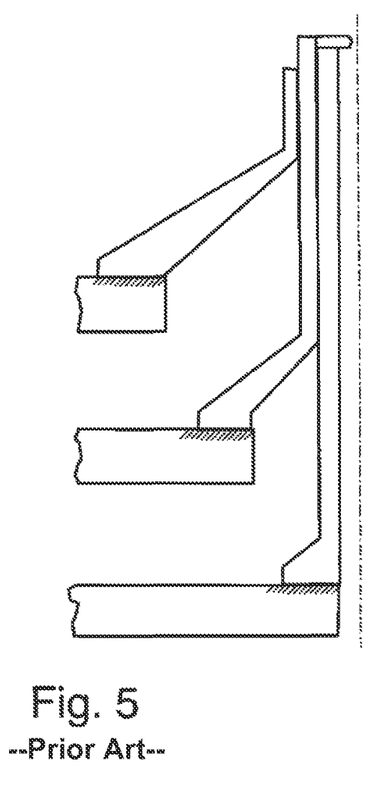
FIG. 5 is a diagram of required surface ratios of two components according to the prior art.

In comparison with FIG. 4, FIG. 5 shows a conventional arrangement according to the prior art which lacks a modular structure and thus needs substantially more space for a thickness of the individual punch carriers and thus also further components, and also needs substantially larger force transmitting surfaces, in relation, than with the modular concept according to FIG. 4. To divert the forces acting on the punch to the outside, surface ratios are necessary which necessitate a need for support surfaces that are three times larger, for example, according to first impressions, in comparison to the modular structure.

LIST OF REFERENCE NUMERALS 1 ceramic-powder and/or metal-powder press
2 die
3 die cavity
4 side press frame
5 bottom press frame
6 top press frame
7 press drive
8 press drive piston
9 die adjustment device
20, 20* ceramic-powder and/or metal-powder press tool
21, 21* base body
22-25, 25* punch
22°-24° punch attachment element
26-29 punch carrier
30-33 coupling rods
34 coupling devices
35-38 spindles
39-42 adjustment drives, in particular electric motor spindle drives
43 spindle gears
45 base
46 frame supports
47-50 positive-stop devices
48° non-adjustable positive-stop device
51-54 support devices
55 bearing
56 adjustable element of positive stop
57 counter-element of positive stop
58 positive-stop thread
59 positive-stop stop
60 positive-stop counter-stop
61 attachment and guide openings
62 punch carrier receiving space
63, 63* receiving or mounting devices for attaching 20 to 6, 8
64 attachment screw
Fp pressing force
Fs force path
P ceramic powder and/or metal powder
x pressing axis

The invention claimed is:

1. A ceramic-powder and/or metal-powder press tool, comprising:
    at least one base body;
    a plurality of punches which, in a press position, are arranged to be insertable from one side into a die cavity of a die filled with ceramic and/or metal powder;
    a plurality of punch carriers, each punch carrier for the attachment of one of the punches, wherein at least one of the punch carriers is couplable to at least two adjustment drives, and wherein the punch carriers are arranged to be adjustable relative to each other and relative to the base body; and
    positive-stop devices arranged to divert, in a press end position, at least part of a pressing force from the punches via the base body; wherein
    at least one of the punch carriers is coupled to or mounted on at least two of the following: coupling rods, spindles and/or spindle nuts, and wherein each such coupling rod is couplable to or mountable on its own such adjustment drive, and wherein each such spindle and/or spindle nut is part of its own adjustment drive.

2. The press tool according to claim 1, wherein part of the positive-stop devices or interposed support devices comprise bearings, through which the coupling rods are passed.

3. The press tool according to claim 1, wherein:
    the positive-stop device, which supports one of the punches and its punch carrier via which the highest effective force acts in relation to the remaining punches in the press end position, is formed as a height-adjustable positive-stop device comprising a force-transmitting adjustable element and a force-transmitting counter-element, wherein the adjustable element comprises a positive-stop stop, wherein the positive-stop stop is adjusted against a positive-stop counter-stop of the force-transmitting counter-element, and
    at least one other of the positive-stop devices is formed as a height-adjustable positive-stop device.

4. The press tool according to claim 1, wherein at least one of the positive-stop devices, and/or at least one support device interposed between the positive-stop devices, surrounds or comprises a punch carrier receiving space, which enables free movement of a punch carrier received in the receiving space in and against a pressing direction of the punches.

5. The press tool according to claim 1, wherein the punch carriers have an elongate, bar-like or star-like extension, and bars formed thereby are coupled or mounted on the adjustment drives via coupling rods.

6. The press tool according to claim 1, comprising a plurality of adjustment drives, wherein at least two of the adjustment drives are coupled to at least one of the punch carriers and each of the adjustment drives comprises an electric motor and each of the electric motors has its own control, and wherein the control means of the adjustment drives adjusting a common punch carrier are driven in synchronism with each other.

7. A ceramic-powder and/or metal-powder press, comprising:
    at least one receiving and/or mounting device adapted for insertion of the press tool of claim 1,
    a press drive having a pressing force couplable via the at least one receiving and/or mounting device into the base body and into a further base body, opposite the base body, of the present or an opposite tool, and
    a plurality of adjustment drives, wherein at least two of the adjustment drives are coupled to at least one of the punch carriers.

8. The press according to claim 7, in which at least part of the adjustment drives are spatially arranged outside of a force path, wherein the force path is formed in the press end position by at least the base body or base bodies, the positive-stop devices-and the punches.

9. The press according to claim 7, in which each of the adjustment drives comprises an electric motor and each of the electric motors has its own control, wherein the control means of the adjustment drives, adjusting a common punch carrier, are driven in synchronism with each other.

10. The press according to claim 7, in which the die is adjustably supported in a press frame of the press by means of a die adjustment device in parallel to the adjustment direction of the punches.

11. A modular system of a ceramic-powder and/or metal-powder press tool according to claim 1, comprising at least two components freely selectable as needed for a pressed part to be pressed from the group comprising:
    supporting devices,
    positive-stop devices, optionally comprising non-height-adjustable positive stops, coupling rods, and punch carriers, wherein the at least two components are each variably available in various dimensions.

12. A method for assembling a ceramic-powder and/or metal-powder press tool according to claim 1, in which:

the positive-stop device which supports that one of the punches and its punch carrier via which the highest effective force acts in relation to the other punches in the press end position, is selected to be a rigid or rigidly acting positive-stop body, and at least one other one of said positive-stop devices is selected to be a height-adjustable positive-stop device.

13. The method according to claim 12, in which the positive-stop devices are arranged to direct the pressing force of a press drive in the press end position via the base body and via the positive-stop devices to the punches and thereby completely around at least part of the punch carriers.

14. The method according to claim 12, in which the positive-stop device which supports that one of the punches and its punch carrier via which the highest effective force acts in relation to the other punches in the press end position, is used as a height-adjustable positive-stop device comprising a force-transmitting adjustable element and a force-transmitting counter-element, wherein the adjustable element comprises a positive-stop stop, wherein the positive-stop stop is adjusted against a positive-stop counter-stop of the force-transmitting counter-element, and at least one other of the positive-stop devices is formed as a height-adjustable positive-stop device.

15. A method of operating a ceramic-powder and/or metal-powder press according to claim 7, in which each of the adjustment drives commonly adjusting one of the punch carriers is driven to synchronously adjust each punch carrier.

16. A method for assembling a ceramic-powder and/or metal-powder press tool according to claim 1, in which the punch carriers are coupled with the adjustment drives pre-arranged within the press only after or as the tool is inserted into the press.

17. A modular system of a ceramic-powder and/or metal-powder press according to claim 7, comprising at least two components freely selectable as needed for a pressed part to be pressed from the group comprising:

supporting devices, positive-stop devices, optionally comprising non-height-adjustable positive stops, coupling rods, and punch carriers, wherein the at least two components are each variably available in various dimensions.

18. A method for assembling a ceramic-powder and/or metal-powder press according to claim 7, in which:

the positive-stop device which supports that one of the punches and its punch carrier via which the highest effective force acts in relation to the other punches in the press end position, is selected to be a rigid or rigidly acting positive-stop body, and at least one other one of said positive-stop devices is selected to be a height-adjustable positive-stop device.

19. The method according to claim 18, in which the positive-stop devices are arranged to direct the pressing force of a press drive in the press end position via the base body, in particular via support devices interposed between the positive-stop devices and via the positive-stop devices to the punches and thereby completely around at least part of the punch carriers.

20. The method according to claim 18, in which the positive-stop device which supports that one of the punches and its punch carrier via which the highest effective force acts in relation to the other punches in the press end position, is used as a height-adjustable positive-stop device comprising a force-transmitting adjustable element and a force-transmitting counter-element, wherein the adjustable element comprises a positive-stop stop, wherein the positive-stop stop is adjusted against a positive-stop counter-stop of the force-transmitting counter-element, and at least one other of the positive-stop devices is formed as a height-adjustable positive-stop device.

21. A method for assembling a ceramic-powder and/or metal-powder press according to claim 7, in which:

the punch carriers are coupled with the adjustment drives pre-arranged within the press only after or as the tool is inserted into the press.

22. The method according to claim 13, in which the positive-stop devices are arranged to direct the pressing force of a press drive in the press end position via the base body via support devices interposed between the positive-stop devices and via the positive-stop devices to the punches and thereby completely around at least part of the punch carriers.

* * * * *